United States Patent Office 3,130,203
Patented Apr. 21, 1964

3,130,203
PHOSPHORIC ACID ESTERS
Karl Heinz Büchel, Beuel, Hans Röchling, Viersen, Rhineland. and Friedrich W. A. G. K. Korte, Hangelar, Germany, assignors to Shell Oil Company, New York, N.Y., a corporation of Delaware
No Drawing. Filed Sept. 24, 1962, Ser. No. 225,884
Claims priority, application Germany Sept. 28, 1961
16 Claims. (Cl. 260—343.2)

The present invention relates to novel phosphoric acid esters useful as pesticides, particularly insecticides. These novel phosphoric acid esters are the alkylphosphoric acid esters of alpha-acyllactones and dialkylphosphoric acid and dialkylthiophosphoric acid esters of alpha-alkoxallyllactones.

These phosphoric acid esters are represented by the generic formula

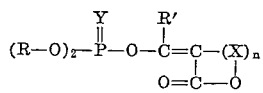

wherein Y=oxygen (6) or sulfur (5), R=alkyl, R'=aryl, alkoxy or carboalkoxy, X=methylene (—CH$_2$—) which may be part of another 6-membered carbocyclic ring and/or substituted with alkyl, aryl or carboalkoxy and $n$=2 or 3.

The alkylphosphoric acid esters of alpha-acyllactones are sub-generically represented by the formula

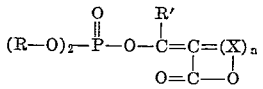

wherein R, R', X and $n$ are as defined herein.

The dialkylphosphoric acid and dialkylthiophosphoric acid esters of alpha-alkoxallyllactones are sub-generically represented by the formula

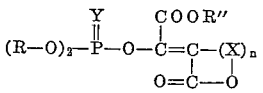

wherein R and R''=alkyl, Y, X and $n$ are as defined herein.

In the above formula, preferably, R=low molecular weight alkyl of from 1 to 7 carbon atoms, such as methyl, ethyl, propyl, isopropyl, butyl, tert-butyl, pentyl, hexyl and heptyl; R'=carboalkoxy with alkoxy of from 1 to 7 carbon atoms, R''=alkyl of from 1 to 7 carbon atoms, Y=O (oxygen) or S (sulfur), X=—CH$_2$— (methylene), both unsubstituted and substituted with alkyl or methylene forming part of another ring and $n$=3.

According to the invention the novel alkylphosphoric acid esters from alpha-acyllactones and trialkylphosphites are prepared by halogenating the corresponding α-acyl-lactones of the general formula:

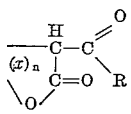

and converting the resultant α-halogen-α-acyllactones with trialkyl phosphites.

The α-acyllactones are halogenated with any suitable halogenating agent, preferably with sulphuryl chloride. The resultant α-halogen-α-acyllactones react with the trialkyl phosphites, an equivalent quantity of alkyl halide being split off. The reaction is usually carried out at temperatures in the range of from 100° C. to 150° C., the alkyl halide being split off.

The starting α-acyllactones are preferably obtained by means of Claisen condensation of lactones with suitable carboxylic acid esters.

When α-acyl-γ-lactones are used, for example, the reaction proceeds as follows:

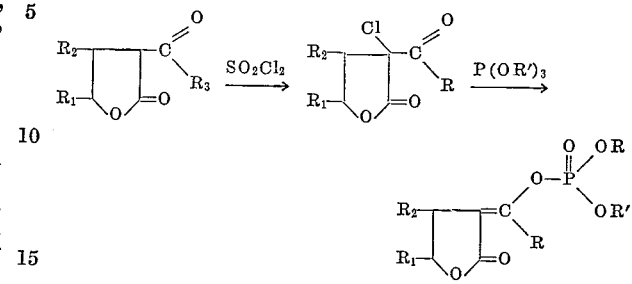

In these formulae R and R' have the same meaning as above, and R$_1$ and R$_2$ represent hydrogen, alkyl, aryl or carbalkoxy or an added ring system. When bi-cyclic α-acyl-δ-lactones are used, for instance, the reaction scheme is as follows:

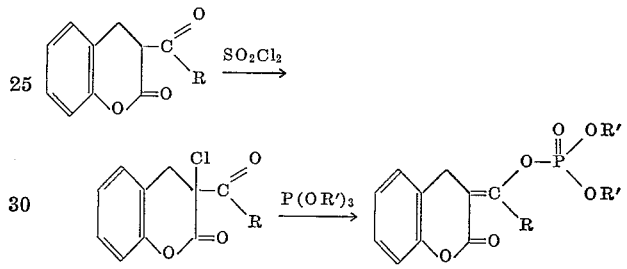

According to the invention the novel dialkylphosphoric acid and dialkylthiophosphoric acid esters of alpha-alkoxallyllactones are prepared by reacting a phosphoric acid dialkyl ester halide or a thiophosphoric acid dialkyl ester halide with an alkali metal or alkaline earth metal derivative of the corresponding α-alkoxallyllactones of the general formula

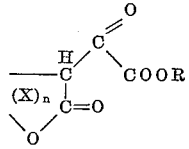

The reaction is preferably carried out in a suitable organic solvent, such as benzene, toluene, xylene, tetrahydrofuran or dimethylformamide or in alcohols.

The halogen in the phosphoric acid dialkyl ester halide or thiophosphoric acid dialkyl ester halide is generally chlorine, but if desired bromine may also be used. The alkali metal in the alkali metal derivative of the α-alkoxallyl lactone is usually sodium.

The reaction is generally carried out at temperatures in the range of from 60° to 100° C., the alkali metal or alkaline earth metal halide being split off. Very good yields are obtained at the boiling temperature of the appropriate inert solvent, which is, therefore, a preferred temperature in the process according to the invention.

The starting α-alkoxallyl lactones are preferably obtained by means of Claisen condensation of lactones with suitable oxalic acid esters.

The novel phosphoric acid esters of the invention may generally be prepared as follows:

EXAMPLE 1

*Ethyl Phosphoric Acid Ester of α-(Hydroxy-Carbethoxy-Methylene)-γ-Butyrolactone*

1 mole of α-ethoxalyl-butyrolactone was dissolved in approximately 400 ml. of methylene chloride and 1.1 moles of sulphuryl chloride was added dropwise at the boiling temperature of the mixture. The solution was subsequently heated under reflux for 3 to 5 hours until the enol reaction with FeCl₃ remained negative. The methylene chloride was then distilled off under normal pressure and subsequently in vacuo, while a dry stream of air was passed through to remove remaining SO₂ and HCl. The residue, consisting of α-chloro-α-ethoxalyl-butyrolactone was fractionated in vacuo (0.1–0.01 mm. Hg). A colorless oil having a boiling point of 109° C.–111° C. (0.01 mm. Hg) was collected in a yield of 66% of theory, which oil formed from ligroin crystals with a melting point of 29–30°.

An equivalent amount of triethyl phosphite was added dropwise to 44 g. of α-chloro-α-ethoxalyl-butyro-lactone at a temperature of 50° C.–60° C. while stirring. The reaction vessel was provided with a reflux condenser to remove the alkyl chloride formed in the reaction. After half the phosphite had been added, the mixture was heated to a temperature of 100° C.–150° C. and subsequently stirred for one hour at the same temperature, with further addition of phosphite. The resultant product, consisting of the diethyl phosphoric acid ester of α-(hydroxy-carbethoxy-methylene)-γ-butyrolactone was fractionated in vacuo (0.01–0.1 mm. Hg) .42 g. (66% of theory) of a light yellow oil having a boiling point of 160° C. (0.01 mm. Hg) and $n_D^{20}=1.4708$ were obtained.

UV-absorption: $\lambda_{max}$: 235 mμ (log ε=3.86)
IR-spectrum:
$\nu_{lactone-C=O}$: 1780 cm.$^{-1}$
$\nu_{ester-C=O}$: 1745 cm.$^{-1}$
$\nu_{C=C}$: 1685 cm.$^{-1}$
$\nu_{P=O}$: 1225 cm.$^{-1}$
$\nu_{P-O-C}$: 1025 cm.$^{-1}$ $C_{12}H_{19}O_8P$ (322.3)—Calculated: C, 44.75; H, 5.95; P, 9.62. Found: C, 44.32; H, 6.12; P, 9.91.

The following Examples 2–14 were carried out similar to that in Example 1.

| Example | Formula: R=C₂H₅ | Duration of reaction, min. | Boiling point, °C./mm. Hg | Refractive index, $n_D^{20}$ | UV-absorption, $\lambda_{max}$(mμ)/log ε | Analysis | Yield |
|---|---|---|---|---|---|---|---|
| 2 | (structure) | 30 | 140/0.03 | 1.4680 | 237/3.89 | Calc. P=9.23 / Found P=8.85 | 80 |
| 3 | (structure) | 45 | 150/0.03 | 1.4700 | 238/4.01 | Calc. P=9.23 / Found P=9.08 | 80 |
| 4 | (structure) | 30 | 135–140/0.03 | 1.4655 | 200/4.21 | Calc. P=8.84 / Found P=8.96 | 60 |
| 5 | (structure) | 60 | 170/0.08 | 1.4931 | 203/4.33 | Calc. P=8.50 / Found P=8.01 | 55 |
| 6 | (structure) | 30 | 150/0.05 | 1.4638 | 220/3.83 | Calc. P=8.18 / Found P=8.52 | 62 |
| 7 | (structure) | 60 | 160–170/0.04 | 1.4302 | 220/3.77 | Calc. P=7.93 / Found P=7.59 | 70 |
| 8 | (structure) | 180 | 160–168/0.04 | 1.5092 | 200/4.33 | Calc. P=8.06 / Found P=7.78 | 44 |

| Example | Formula: R=$C_2H_5$ | Duration of reaction, min. | Boiling point, °C./mm. Hg | Refractive index, $n_D^{20}$ | UV-absorption, $\lambda_{max}(m\mu)$/log $\epsilon$ | Analysis | Yield |
|---|---|---|---|---|---|---|---|
| 9 | (structure with benzofuranone, P(=O)(OR)(OR), $CO_2R$) | 180 | 155–160/0.1 | 1.5375 | 200/4.35<br>272/3.31 | Calc. P=8.06<br>Found P=7.93 | 51 |
| 10 | (structure with cyclohexane-fused lactone, P(=O)(OR)(OR), $CO_2R$) | 45 | 155–165/0.02 | 1.4838 | 235/3.90 | Calc. P=8.21<br>Found P=8.11 | 80 |
| 11 | (structure with lactone, P(=O)(OR)(OR), $OCH_3$) | 30 | 158–160/0.1 | 1.4665 | 237/4.05 | Calc. P=10.12<br>Found P=9.85 | 60 |
| 12 | (structure with lactone, P(=O)(OR)(OR), phenyl) | 120 | 174/0.1<br>F.p. 88 | | 207/4.05<br>267/4.16 | Calc. P=9.49<br>Found P=9.29 | 85 |
| 13 | $RO_2C$—(structure with lactone, P(=O)(OR)(OR), $CO_2R$) | 60 | 165–170/0.02 | 1.4683 | 235/4.21 | Calc. P=7.85<br>Found P=7.52 | 45 |
| 14 | $H_3C$—(structure with lactone, P(=O)($ORH_3$)($ORH_3$), $CO_2R$) | 30 | 150/0.02 | 1.4737 | 237/3.97 | Calc. P=10.05<br>Found P=9.89 | 50 |

EXAMPLE 15

*Diethylthiophosphoric Acid Esters of Alpha-(Hydroxycarbethoxymethylene)-γ-Butyrolactone*

One mol. of the sodium salt of alpha-ethoxallylbutyrolactone was suspended in toluene and heated to its boiling temperature with stirring. 1.1 mols of diethylthiophosphoric acid ester chloride were slowly added dropwise to this solution which was then heated for 4 days under reflux. The precipitated sodium chloride was separated from the solution and the solvent distilled off. The residue was fractionated in vacuo (0.01–0.1 mm. Hg) and a dark yellow oil having a boiling point of 130°–135° C. (at 0.01 mm. Hg) and a refractive index $n_D^{20}$=1.4345 collected in a yield of 38% of theory.

UV absorption: $\lambda_{max}$=240 m$\mu$ (log $\epsilon$=3.98)
IR spectrum:
$\nu_{C=O\ lactone}$: 1770 cm.$^{-1}$
$\nu_{C=C}$: 1675 cm.$^{-1}$
$\nu_{C=O\ ester}$: 1730 cm.$^{-1}$
$\nu_{P-O-C}$: 1025 cm.$^{-1}$

*Analysis.*—Calculated: P=9.15, S=9.48. Found: P=8.90, S=9.05, for $C_{12}H_{19}O_7PS$.

EXAMPLE 16

*Diethylphosphoric Acid Ester of Alpha-(Hydroxycarbethoxymethylene)-γ-Butyrolactone*

One gr. atom of finely divided sodium was suspended in 500 ml. of benzene as solvent, and 1 mol of alpha-ethoxallylbutyrolactone and 2 ml. of absolute ethanol were added. The reaction mixture was heated with stirring to 50°–70° C. until the sodium salt formed. 1.1 mols of diethylphosphoric acid ester chloride were subsequently added dropwise and the reaction mixture was heated under reflux for 24 hours. The precipitated sodium chloride was drawn off by suction and the solvent distilled off. The residue was fractionated in vacuo (0.01–0.1 mm. Hg) and a product obtained which had a boiling point of 160° C. (0.01 mm. Hg) and a refractive index $n_D^{20}$=1.4708. The yield was 50% of theory.

UV absorption: $\lambda_{max}$=235 m$\mu$ (log $\epsilon$=3.86)
IR spectrum:
$\nu_{C=O\text{-lactone}}$: 1780 cm.$^{-1}$
$\nu_{C=O\text{-ester}}$: 1745 cm.$^{-1}$
$\nu_{C=C}$: 1685 cm.$^{-1}$
$\nu_{P=O}$: 1225 cm.$^{-1}$
$\nu_{P-O-C}$: 1025 cm.$^{-1}$

*Analysis.*—Calculated: C=44.75; H=5.95; P=9.62. Found: C=44.32; H=6.12; P=9.91; for $C_{12}H_{19}O_8P$.

The following Examples 17–29 were carried out similar to that in Example 15.

| Example | Formula: R=$C_2H_5$ | Solvent | Reaction time, days | Boiling point, °C./mm. Hg | Refractive index, $n_D^{20}$ | UV-absorption, $\lambda_{max}(m\mu)/\log \epsilon$ | Analysis | Yield, percent |
|---|---|---|---|---|---|---|---|---|
| 17 | [structure] | Xylene | 4 | 120–124/0.01 | — | 240/6.20 | Calc. P=9.34<br>Found P=9.02 | 30 |
| 18 | [structure] | Toluene | 2 | 140–148/0.02 | 1.4882 | 201/3.85 | Calc. P=8.45<br>Found P=8.20 | 49 |
| 19 | [structure] | Xylene | 3 | 150/0.03 | 1.4700 | 238/4.01 | Calc. P=9.23<br>Found P=9.08 | 75 |
| 20 | [structure] | Toluene | 2 | 130–135/0.01 | 1.4945 | 240/3.98 | Calc. P=8.79<br>Found P=8.25 | 49 |
| 21 | [structure] | do | 2 | 125–130/0.01 | 1.4892 | 201/3.92 | Calc. P=8.79<br>Found P=8.35 | 38 |
| 22 | [structure] | do | 3 | 150–160/0.02 | 1.4894 | 201/3.84 | Calc. P=8.14<br>Found P=7.85 | 46 |
| 23 | [structure] | do | 3 | 140–145/0.03 | 1.4785 | 200/3.95 | Calc. P=7.85<br>Found P=7.53 | 50 |
| 24 | [structure] | do | 4 | 130–135/0.04 | 1.5082 | — | Calc. P=7.44<br>Found P=7.25 | 40 |
| 25 | [structure] | Xylene | 4 | 110–115/0.02 | 1.5023 | 225/3.90 | Calc. P=7.62<br>Found P=7.50 | 30 |
| 26 | [structure] | Toluene | 4 | 130–140/0.01 | 1.4985 | — | Calc. P=7.85<br>Found P=7.58 | 25 |
| 27 | [structure] | Xylene | 4 | 155–165/0.01 | — | 238/4.18 | Calc. P=7.56<br>Found P=7.30 | 35 |

The novel phosphoric acid esters of the present invention are highly active biocides especially insecticide which are particularly suitable for the control of a great variety of pests, such as *Acyrthosiphon pisum* (pea aphid) and *Tetranychus telarius* (red spider mite).

For use as biocides the novel phosphoric acid esters are suitably worked up into dusts, wettable powders or emulsifiable concentrates.

The widespread and marked effect of the novel phosphoric acid esters in the control of various pests is illustrated by the following experiments.

Firstly, experiments with larvae of *Aëdes aegypti* were carried out in the following manner:

0.1 ml. of a solution of 1 part of phosphoric acid ester in 1 million parts of acetone was added to batches of 30 five-day-old larvae present in a vessel containing 100 ml. of water of 27° C. and counts of mosquito larvae killed were made after 24 hours.

This experiment was duplicated with 0.1 ml. of pure acetone and again duplicated with 0.1 ml. of a solution of 0.02 part of dieldrin in 1 million parts of acetone. In the dieldrin experiment 50% of the larvae were killed and in the experiment with pure acetone 0%.

Secondly, experiments with *Musca domestica* were carried out in the following manner:

20 five-day-old flies were stunned with carbon dioxide and 1 cu. mm. of a solution of 1 part of phosphoric acid ester in one million parts of acetone was trickled on to theor abdomens from a micro-syringe. The flies were transferred to a sugar solution and counted after 24 hours.

Thirdly, experiments with *Acyrthosiphon pisum* and *Tetranychus telarius* were carried out in the following manner:

30 five-day-old specimens on suitable plants were sprayed with a solution of 1 part of phosphoric acid ester in one million parts of acetone and counts of pests killed were made after 24 hours.

Fourthly, experiments with *Tribolium confusum* were carried out in the following manner:

The novel phosphoric acid esters to be tested were absorbed on a disc of filter paper of 9 cm. diameter in the form of 1 ml. of a solution of 1 part of the ester to one million parts of acetone and after 24 hours the percentage kill of the pests placed on the filter paper was determined.

The Table 2A denotes total kill, B partial kill and C no kill.

TABLE 1

| Compound according to Example | Aedes aegypti larvae | Acyrthosiphon pisum | Tetranychus telarius | Musca domestica | Tribolium confusum |
|---|---|---|---|---|---|
| 15 | B | A | A | | |
| 18 | A | A | A | A | A |
| 20 | B | A | A | A | |
| 21 | A | A | A | A | A |
| 22 | A | A | A | A | |
| 23 | A | A | A | A | A |
| 27 | A | A | A | A | A |

These data show that a very successful pest control is possible with the novel phosphoric acid esters of the invention in practically all the afore-mentioned experiments.

It is to be understood that the invention is not to be limited to the exact details of operation shown and described, as obvious modifications and equivalents will be apparent to one skilled in the art and the invention is, therefor, limited only by the scope of the appended claims.

We claim as our invention:

1. A compound having the formula

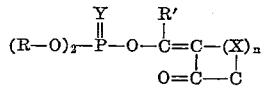

wherein

R represents alkyl of from 1 to 7 carbon atoms, R' represents carboalkoxy with alkoxy of from 1 to 7 carbon atoms, X represents an unsubstituted member selected from the group consisting of methylene ($-CH_2-$), methylmethylene, dimethylmethylene, and methylene forming part of one ring which is a six-membered carbocyclic ring and wherein said carbocyclic ring is selected from the group consisting or ortho-phenylene and ortho-cyclohexylene, and n is a whole number from 2 to 3.

2.

3.

4.

5.

6.

7.

8.

9.

10. 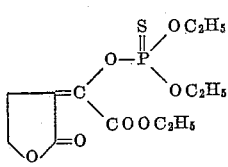
11. 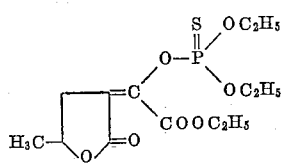
12. 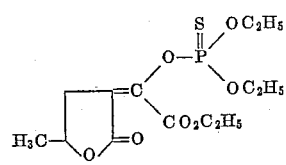
13. 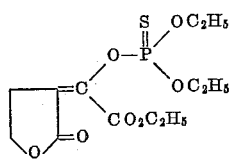
14. 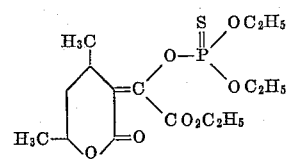
15. 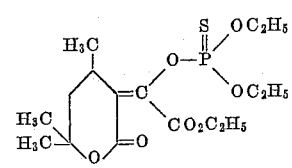
16. 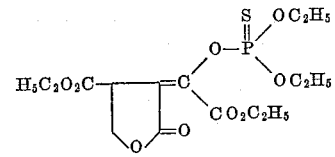
References Cited in the file of this patent
Arbuzov et al.: Izvest. Akad. Nauk, SSSR, Otdel. Khim. Nauk, No. 4 (1955), translation RJ-335 (Assoc. Tech. Serv. Inc.), pages 2, 3, 6 and 7 of translation.

UNITED STATES PATENT OFFICE
CERTIFICATE OF CORRECTION

Patent No. 3,130,203　　　　　　　　　　　　　　April 21, 1964

Karl Heinz Büchel et al.

It is hereby certified that error appears in the above numbered patent requiring correction and that the said Letters Patent should read as corrected below.

Column 9, line 73, after "wherein" insert -- Y represents a member selected from the group consisting of oxygen and sulfur, --.

Signed and sealed this 15th day of September 1964.

(SEAL)
Attest:

ERNEST W. SWIDER
Attesting Officer

EDWARD J. BRENNER
Commissioner of Patents